(12) United States Patent
Pouydebasque et al.

(10) Patent No.: US 8,551,352 B2
(45) Date of Patent: Oct. 8, 2013

(54) METHOD FOR PRODUCING A DEVICE WITH A FLUID-ENCAPSULATING MEMBRANE

(75) Inventors: Arnaud Pouydebasque, Le Versoud (FR); Sébastien Bolis, Crolles (FR); Fabrice Jacquet, Saint Pierre de Mesage (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 261 days.

(21) Appl. No.: 13/177,840

(22) Filed: Jul. 7, 2011

(65) Prior Publication Data
US 2012/0006783 A1    Jan. 12, 2012

(30) Foreign Application Priority Data
Jul. 12, 2010  (FR) ..................... 10 55664

(51) Int. Cl.
*C03C 15/00*     (2006.01)
(52) U.S. Cl.
USPC .............. 216/33; 359/666; 350/419; 156/145
(58) Field of Classification Search
None
See application file for complete search history.

(56) References Cited

U.S. PATENT DOCUMENTS

| | | | | |
|---|---|---|---|---|
| 4,444,471 | A * | 4/1984 | Ford et al. | 359/676 |
| 4,890,903 | A * | 1/1990 | Treisman et al. | 359/666 |
| 5,574,598 | A * | 11/1996 | Koumura et al. | 359/666 |
| 5,668,620 | A * | 9/1997 | Kurtin et al. | 351/158 |
| 5,705,018 | A * | 1/1998 | Hartley | 156/345.1 |
| 2002/0184907 | A1* | 12/2002 | Vaiyapuri et al. | 62/259.2 |
| 2007/0030573 | A1* | 2/2007 | Batchko et al. | 359/665 |
| 2007/0163875 | A1 | 7/2007 | Van Der Meer et al. | |
| 2008/0212161 | A1 | 9/2008 | Valette et al. | |
| 2010/0182703 | A1 | 7/2010 | Bolis | |

FOREIGN PATENT DOCUMENTS

| | | |
|---|---|---|
| FR | 2 889 633 A1 | 2/2007 |
| FR | 2 919 073 A1 | 1/2009 |
| WO | WO 2005/109043 A1 | 11/2005 |

OTHER PUBLICATIONS

Seung Tae Choi et al, Liquid-filled varifocal lens on a chip, 2009, DPIR. z[tpv/ pg DPIR 7208 72080P-1, 9 pages.*

(Continued)

*Primary Examiner* — Binh X Tran
*Assistant Examiner* — David Cathey, Jr.
(74) *Attorney, Agent, or Firm* — Oblon, Spivak, McClelland, Maier & Neustadt, L.L.P.

(57) ABSTRACT

The invention relates to a method for producing a device with a membrane used to encapsulate a fluid contained in a cavity, in which:
two substrates (110, 120) are provided;
a membrane (111) is placed on one and/or on the other of the substrates;
one or more walls (113) are formed, helping to laterally define the cavity (114), in which said walls are located on or in one of the substrates and/or on or in the other of the substrates, and said cavity is intended to contain the fluid,
the two substrates (110, 120) are assembled together by superimposing one on the other so as to complete the cavity, in which the or each membrane (111) also helps to define the cavity,
the fluid (117) is encapsulated in the cavity between the substrates, and the or each membrane is soaked by the fluid,
at least a portion of one of the substrates and/or the other of the substrates is removed insofar as one and/or the other of the substrates are equipped with a membrane, in order to release the membrane at least in the central portion thereof.

14 Claims, 8 Drawing Sheets

(56) References Cited

OTHER PUBLICATIONS

French Search Report issued Jan. 27, 2011, in Patent Application No. 1055664 (with English Translation of Category of Cited Documents).
Jeong Yub Lee, et al., "Microfluidic design and fabrication of wafer-scale varifocal liquid lens", The International Society for Optical Engineering, vol. 7426, Aug. 2009, 1 page.
Seung Tae Choi, et al., "Liquid-filled varifocal lens on a chip", The International Society for Optical Engineering, vol. 7208, Jan. 2009, 1 page.
Nguyen Binh-Khiem, et al., "Polymer thin film deposited on liquid for varifocal encapsulated liquid lenses", Applied Physics Letters, vol. 93, Issue 12, Sep. 2008, pp. 124101-124101-3.

* cited by examiner

METHOD FOR PRODUCING A DEVICE WITH A FLUID-ENCAPSULATING MEMBRANE

TECHNICAL FIELD

This invention relates to the production of devices with a fluid-encapsulating membrane.

In most applications, the fluid will be incompressible. A fluid is said to be incompressible when its volume remains almost constant under the action of an external pressure. In this context, the fluid can be a liquid or a gel, as gases are not incompressible.

Such a device with an incompressible fluid-encapsulating membrane can be used, for example, as a lens with an adjustable focal length, a mirror with adjustable curvature or a micro-pump.

The invention can of course be applied to other devices requiring a membrane to be placed on a cavity containing a fluid, whether or not the fluid is incompressible.

PRIOR ART

Figure 1A:
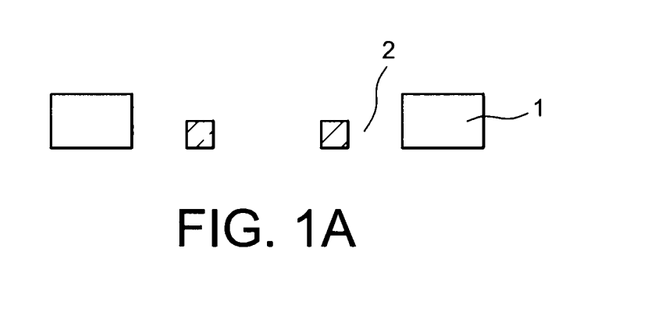
FIGS. 1A to 1E, already described, show different steps of a method of the prior art for producing a device with a membrane used to encapsulate a fluid.
Figure 1B:
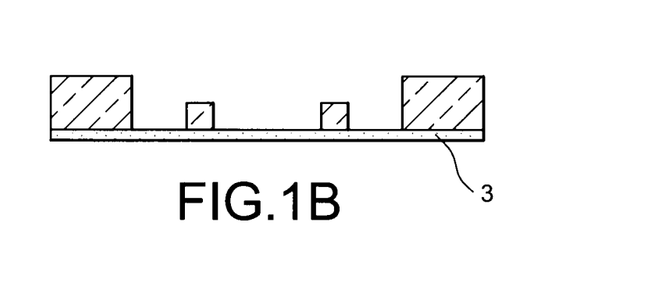
Figure 1C:
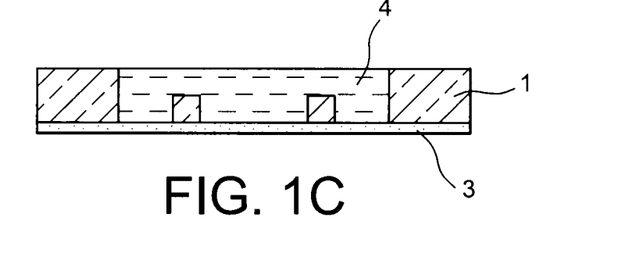
Figure 1D:
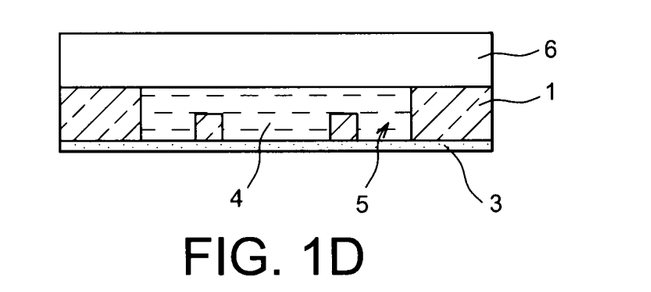
Figure 1E:
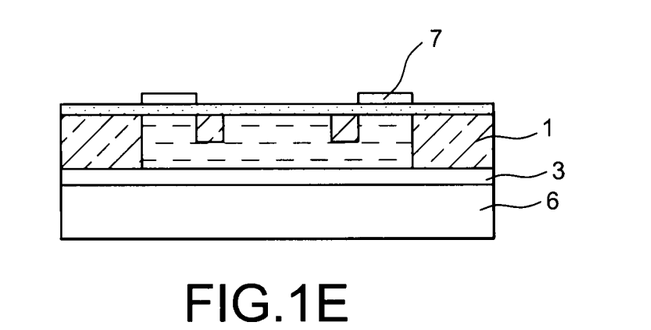

Two types of techniques are generally used to encapsulate a fluid under a membrane. A first method will now be described, which is based on the teaching of document [1], of which the references are provided at the end of the description. It involves starting with a frame 1 having one or more through-openings 2 (FIG. 1A). The edges of the frame 1 are intended to define at least one cavity that will contain the fluid 4; this cavity will be closed off by a membrane 3. The membrane 3 is attached to one of the main faces of the frame 1, and is glued to the frame 1. Then, the cavity 5 is created (FIG. 1B). If the fluid 4 is a liquid or a gel, the cavity 5 is filled with the liquid or the gel (FIG. 1C). It is already filled if the gas is air. Then, a substrate 6 is secured to the other main face of the frame 1, and will close the cavity 5 so as to prevent the fluid 4 from escaping (FIG. 1D). Alternatively, it is possible to introduce it into the cavity 5 once the substrate 6 has been secured to the frame 1 by a hole provided for this purpose in the substrate. This hole will then be plugged after filling. This alternative is not shown. The last FIG. 1E shows the membrane equipped with actuation means 7 intended to cause it to move in order to drive the fluid 4 toward the central portion of the cavity 5.

Document [2], of which the references are provided at the end of the description, also discloses a membrane directly attached on a rigid open frame assembled to a transparent substrate.

A disadvantage of the method described in these documents is that it is suitable only for membranes with a sufficient thickness, typically with thicknesses greater than 50 micrometers for a polydimethylsiloxane membrane. Thinner, very flexible or very large membranes are too fragile to be transferred on the frame. The applications listed above require membranes with a very low thickness, less than several tens of micrometers, and flexible enough to be capable of being significantly deformed when the actuation means are actuated.

In addition, the actuation means can be located only on the face of the membrane opposite the fluid; otherwise, when the membrane is transferred, there is a high risk of deformation and of damage to the membrane. In the context of a liquid lens with electrostatic actuation, it is clearly preferable to position the electrodes of one pair of electrodes forming the actuation means in contact with the fluid in order to optimize the forces generated.

Yet another disadvantage is that the deformation of the membrane at rest is highly dependent on the bead of adhesive used to secure the membrane to the frame, and on the amount of fluid encapsulated. It is extremely difficult to predict this deformation at rest, and in particular it is almost impossible to obtain a flat or quasi-flat membrane at rest.

Figure 2:
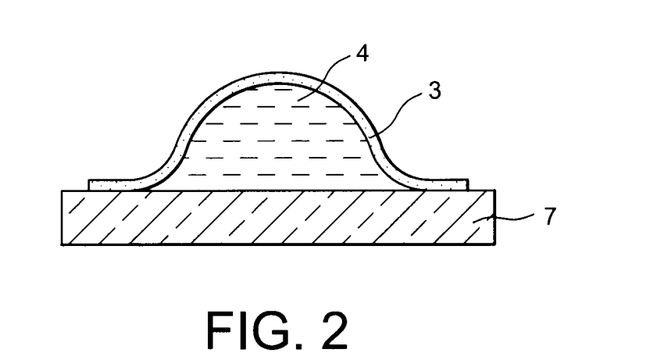
FIG. 2, already described, shows a cross-section of a device with a membrane used to encapsulate a fluid obtained by a method of the prior art.

Another known method, based on the teaching of document [3], of which the references are provided at the end of the description, will be described below. It involves starting with a substrate 7, which defines at least one cavity or which can be flat as shown in FIG. 2. A liquid 4 is deposited directly onto the substrate 7 then the membrane 3 directly on the liquid 4 by a chemical vapor deposition CVD method. One of the only materials suitable for this chemical vapor deposition is parylene (poly-p-xylylene polymer). The rigidity of this material is, for a large number of applications, too high with respect to that of other materials, which are more suitable but which cannot be deposited by CVD. The Young's modulus of parylene is on the order of 3 GPa, while silicone derivatives have Young's moduli on the order of 100 MPa.

Another disadvantage of this method is that it is performed at low pressure, on the order of $4.10^{-2}$ HPa, which excludes the use, as for a fluid, of a gas and most liquids that will evaporate under CVD deposition.

Like the technique described above, it is not possible to functionalize the membrane with actuation means located on the liquid side.

Also with this technique, it is difficult to control the deformation of the membrane at rest, as this deformation is dependent on the shape of the liquid drop deposited on the substrate as well as its behavior under vacuum during deposition.

Another technique, described for example in the patent application FR 2 919 073, consists of depositing a sacrificial material in a cavity provided in a substrate, depositing the membrane on the sacrificial material by allowing it to overflow onto the substrate so as to anchor it there, removing the sacrificial material through a hole drilled in the substrate and replacing it with the fluid, then plugging the hole of the substrate. The disadvantage of this technique is due to the sacrificial material. Indeed, it is difficult to remove it; it is time-consuming, taking several tens of hours, and it is never certain to be entirely removed. If sacrificial material remains, it may disrupt the operation of the actuation means, which would be soaked by the fluid or pollute the fluid.

DESCRIPTION OF THE INVENTION

This invention is intended to propose a method for producing a device with a membrane encapsulating a fluid that does not have the limitations and problems mentioned above.

In particular, the method according to the invention makes it possible to use a wide range of fluids and materials for the membrane.

Another objective of the invention is to produce a device with a fluid-encapsulating membrane in which the deformation of the membrane at rest can be predicted, and said deformation can be null.

Yet another objective of the invention is to produce a device with a fluid-encapsulating membrane in which the membrane can be equipped with at least one instrument such as actuation means or a sensor arranged on the fluid side.

An additional objective of the invention is to produce a device with a fluid-encapsulating membrane without having to use a sacrificial material that may present problems during use of the device with a membrane if it has not been properly removed.

To achieve these objectives, the invention relates more specifically to a method for producing a device with a membrane used to encapsulate a fluid contained in a cavity, in which:

two substrates are provided;

a membrane is placed on one and/or on the other of the substrates;

one or more walls are formed, helping to laterally define the cavity, in which said walls are located on or in one of the substrates and/or on or in the other of the substrates, and said cavity is intended to contain the fluid.

the two substrates are assembled together by superimposing one on the other so as to complete the cavity, in which the or each membrane also helps to define the cavity, the fluid is encapsulated in the cavity between the substrates, and the or each membrane is soaked by the fluid, at least a portion of one of the substrates and/or the other of the substrates is removed insofar as one and/or the other of the substrates are equipped with a membrane, in order to release the membrane at least in the central portion thereof, and the membrane is at least partially supported by the fluid as it is released.

The phrase "these walls are located on one of the substrates and/or on the other of the substrates" means above the substrate concerned.

The fluid can be deposited on one of the substrates or distributed over the two substrates before assembly of the two substrates.

Alternatively, the fluid can be introduced into the cavity once the two substrates are assembled.

The introduction can be performed by means of at least one through-hole in one of the substrates and/or in a wall.

To control the state of stress of membrane or of each membrane once released, a buffer layer can be inserted between one of the substrates and the membrane and/or between the other of the substrates and the membrane, in which said buffer layer has a desired tensile stress so that the membrane has a determined tensile stress when it is released.

It is possible to remove the buffer layer in order to release the membrane at least in the central portion thereof.

It is possible to provide the membrane and/or one of the substrates with at least one instrument such as actuation means, or a sensor.

The instrument is preferably in contact with the fluid.

The formation of the walls on one of the substrates can be performed by deposition of a material in a bead, which material can be adhesive, and/or by etching of the substrate and/or by depositing a modeling layer on the substrate, then etching the modeling layer and/or by using a preformed modeling layer.

The membrane can be deposited by chemical vapor deposition if it is inorganic or in parylene, or by spin coating or by placing a film if it is organic.

The assembly of the two substrates can be performed by bonding.

The fluid can be deposited or introduced by a so-called dispensing technique or by spraying.

The fluid can be in liquid, gas or gel form.

BRIEF DESCRIPTION OF THE DRAWINGS

This invention can be better understood in view of the following description of examples of embodiments, provided purely as non-limiting indications, in reference to the appended drawings, in which.

Identical, similar or equivalent parts of the different figures have the same numeric references in order to make it easier to go from one figure to another.

The different parts shown in the figures are not necessarily shown according to a uniform scale, so that the figures are easier to read.

DETAILED DESCRIPTION OF SPECIFIC EMBODIMENTS

A first example of the method of the invention will now be described in reference to FIGS. 3A to 3E.

Figure 3A:
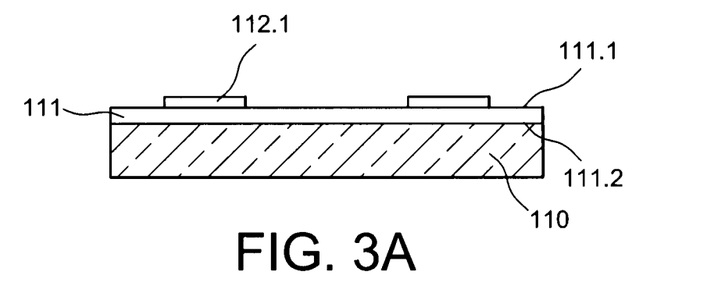
FIGS. 3A to 3E show different steps of an example of an embodiment of a device with a membrane used to encapsulate a fluid, according to the invention.
Figure 3B:
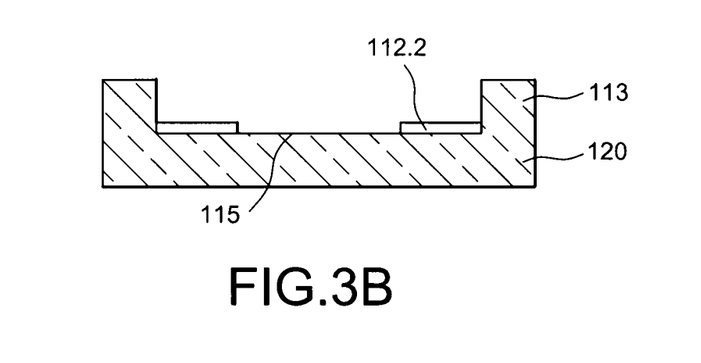

It involves starting with a first substrate 110 (FIG. 3A) and a second substrate 120 (FIG. 3B). Substrates 110, 120 can be made of an inorganic material such as glass, quartz, sapphire, silicon or another semiconductor material, or metal. Alternatively, they can be made of an organic material such as polyethylene terephthalate PET, polyethylene naphthalate PEN, polymethyl methacrylate PMMA, or polycarbonate PC. If the application of the device obtained by the method according to the invention is a varifocal liquid lens, one of the substrates remaining at the end of the process for encapsulating the fluid will be chosen so as to be transparent to the optical radiation to pass through the lens.

A membrane 111 is placed on one of the substrates, in this case, in this example, on the first substrate 110. The membrane 111 covers one of the main faces of the first substrate 110; it has a free face 111.1 and a face 111.2 in contact with the first substrate 110. Alternatively, it is possible to place a membrane on each of the substrates, as will be seen below.

The membrane 111 can be based on organic materials such as polydimethylsiloxane, polymethyl methacrylate, polyethylene terephthalate, polycarbonate, parylene, epoxide or silicone resins, photosensitive resins, or inorganic materials such as silicon, silicon oxide, silicon nitride, silicon carbide, polycrystalline silicon, titanium nitride, diamond carbon, tin and indium oxide, aluminum, copper and nickel. In the liquid lens application, the membrane will be transparent to the optical radiation to pass through it and in the mirror application, it will be reflective to the incident optical radiation.

The membrane 111 can be deposited on the first substrate by chemical vapor deposition CVD in particular if it is inorganic or parylene or by spin coating for other organic materials. Another means is to use, for membrane 111, an organic film, for example in a roll or in a plate that is pressed onto the first substrate. The use of photosensitive resins once the membrane has been deposited makes it possible to etch with a simple lithography step in order to define the contour.

It is also possible to provide the membrane 111 with at least one instrument 112.1. By instrument, we mean an object produced for a particular use. This instrument can be entirely or partially means for actuating the membrane, a sensor, such as an environmental sensor capable of detecting, for example, moisture, pressure, temperature, the nature of residual gases or such a movement sensor, such as, for example, a gyroscope, an accelerometer, a magnetometer, or the like.

In the example of FIG. 3A, the instrument 112.1 is represented as one of the electrodes of an electrostatic actuation device with at least one pair of electrodes placed opposite one another. It is produced on the free face 111.1 of the membrane 111. It can be seen that the second substrate 120 will be equipped with the other electrode of the pair.

The instrument 112.1, if it is a membrane actuation means, can be an electrically conductive electrode as just described, an element made of a piezoelectric material, of a magnetic material, or of an electroactive polymer that is deformed by an electrical current.

At least one wall 113 is formed on at least one of the substrates 110, 120, which wall 113 helps to laterally define a cavity 114 to receive a fluid. The membrane 111 also serves to encapsulate the fluid in the cavity 114 (FIG. 3B).

In the example of FIG. 3, the wall 114 is produced on the second substrate 120. The second substrate 120 will then serve as a base 115 for the cavity 114. It is understood that a wall can be formed on the first substrate, on the side of the membrane or on the two substrates, in which case the walls of the two substrates will have to cooperate in order to define the cavity.

In this example of FIG. 3, the wall 113 is produced by etching a dish 116 in the central portion of the second substrate 120, with the edges of the dish forming the wall 113 and the base of the dish 116 forming the base 115 of the cavity.

If the second substrate 120 is made of silicon, the etching can be performed by reactive ion etching, physical plasma etching, for example of xenon difluoride $XeF_2$ or sulfur hexafluoride $SF_6$, or by wet chemical etching with, for example, tetramethylammonium hydroxide TMAH or potassium hydroxide KOH.

It is understood that it is possible to produce the wall of the cavity in other ways, for example by depositing a bead of suitable material on the second substrate. It is possible to use, to form the bead, a negative bonding resin, such as benzocyclobutene BCB or polymer siloxane SiNR. The bead makes it possible both to define the cavity and to seal the first and second substrates. Other adhesives can be envisaged, such as thermosetting adhesives or adhesives hardening under ultraviolet radiation.

It is also possible to produce a bead by performing a step of deposition, onto the second substrate, of an inorganic material such as silicon oxide or silicon nitride, and a step of lithography and of etching of the material deposited.

The base 115 of the dish 116 is equipped with another instrument 112.2, which, in this example, is another electrode having to cooperate and form a pair with the electrode 112.1 borne by the membrane 111 (FIG. 3B).

Figure 3C:
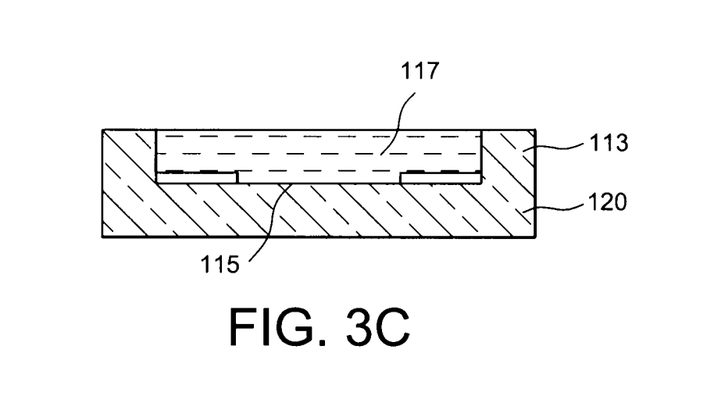

The dish is filled with fluid 117 (FIG. 3C). It is understood that this step may take place later. As indicated above, the fluid 117 can be a gas, a liquid or a gel. In the varifocal liquid lens, adjustable-curvature mirror or micropump applications, an incompressible fluid, which will therefore be a liquid or a gel, will preferably be selected. Better performances are then obtained during actuation. It is of course possible for the fluid to be compressible and a gas can then be used.

The filling of the dish 116 can be performed by means of a syringe or the like, i.e. by a so-called dispensing technique, or by spraying from a nozzle. For a gaseous fluid, the equipment is placed at the time of assembly in a chamber containing the gas at a desired pressure and having a desired composition.

The volume of fluid placed in the dish 116 must be adapted to the volume that the cavity will have once closed. It may be desirable for the membrane 111 to bulge slightly or for it to be plane at rest.

The base 115 of the dish 116 must have a wettability so that the liquid or the gel can optimally be spread on the base 115, so that the entire volume of the cavity 114 can easily be filled.

The fluid can be a gas such as, for example, air, nitrogen, helium, a liquid such as propylene carbonate, water, an indicating liquid, an optical oil, an ionic liquid, or a gel such as an elastomer, for example, polydimethylsiloxane PDMS.

Alternatively, in particular if the fluid 117 is a liquid or a gel, it is possible to deposit the fluid on the first substrate 110, on the membrane side 111, or to deposit the fluid 117 both on the first substrate 110 and on the second substrate 120.

Figure 3D:
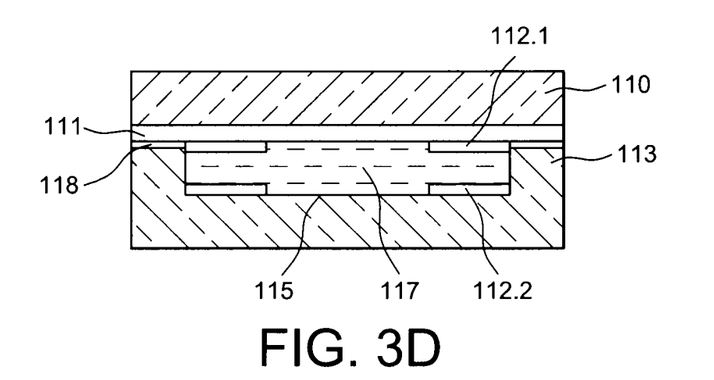

The first substrate 110 and the second substrate 120 are then assembled by superimposing one on the other and by placing the membrane opposite the dish, so as to complete the cavity and encapsulate the fluid 117 (FIG. 3D).

This assembly can be performed by bonding, by choosing an adhesive 118 and a bonding mode compatible with the fluid 117 to be encapsulated. In particular, the temperature and pressure conditions must be prevent evaporation of the fluid 117.

Bonding with ultraviolet radiation activation can be envisaged for fluids 117 evaporating at room temperature. This of course assumes that one of the substrates 110, 120, at least, is transparent to ultraviolet radiation. Some heat bonding operations can be performed at 80° C. The bonding can be performed in a chamber in which the atmosphere, pressure and temperature are controlled so that the fluid does not evaporate.

Figure 3E:
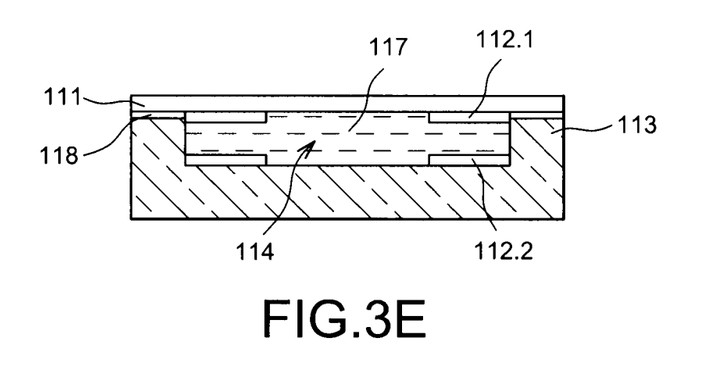

It is then possible to remove the first substrate 110 in order to release the membrane 111. In the example of FIG. 3E, the first substrate 110 is entirely removed. This entire removal is suitable if the membrane 111 is attached tightly to the wall 113 of the cavity 114. If there is a risk of detachment, it is preferable to remove the first substrate only in the central portion thereof. The membrane is at least partially held by the fluid as it is released.

The removal of the first substrate 110 can be performed, for example, by reactive ion etching RIE and preferably by deep reactive ion etching DRIE. What distinguishes the two methods is the depth of the etching. The typical RIE etching depths are limited to several micrometers and the etching speeds are up to around one micrometer per minute. DRIE etching etches much deeper patterns, up to around 600 micrometers or even faster, at speeds on the order of 20 micrometers per minute. DRIE etching is therefore suitable for this application.

If the first substrate 110 is made of silicon, it is also possible to perform a physical plasma etching, for example of $XeF_2$ or $SF_6$, or wet chemical etching with, for example, tetramethylammonium hydroxide TMAH or potassium hydroxide KOH.

Figure 4A:
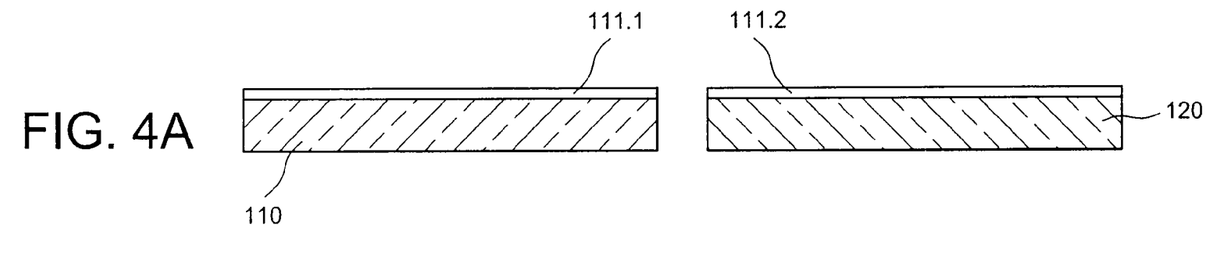
FIGS. 4A to 4E show different steps of another example of an embodiment of a device with a membrane used to encapsulate a fluid, according to the invention.

In reference to FIGS. 4A to 4E, another example of the method according to the invention will be described. It again involves starting with a first substrate 110 and a second substrate 120, but now a membrane 111.1, 111.2 is placed on each of the substrates 110, 120 (FIG. 4A).

Figure 4B:
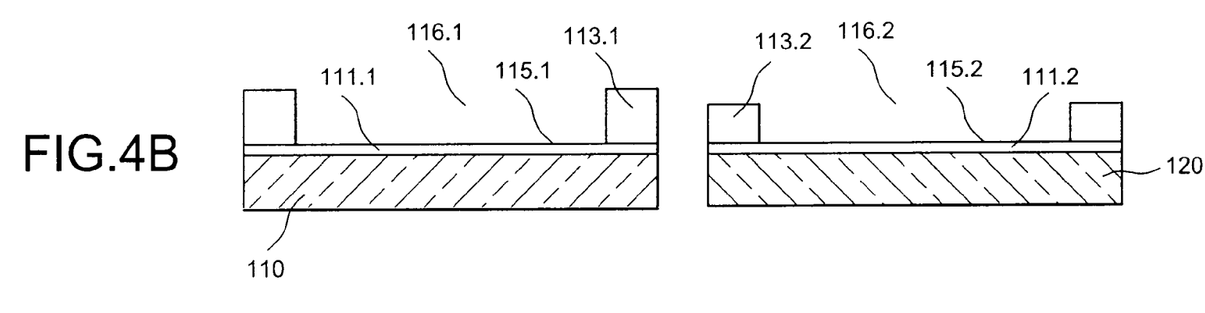

A dish 116.1, 116.2 is formed on each of the substrates 110, 120, defined by one or more walls 113.1, 113.2 (FIG. 4B). The walls 113.1, 113.2 of FIG. 4B help to laterally define a cavity, and are located above the substrates 110, 120. In this example, the walls 113.1, 113.2 can be formed by an adhesive bead, for example, of negative bonding resin, such as, for example, resin based on benzocyclobutene BCB or polymer siloxane (SiNR). The use of such materials makes it possible both to form the wall of the cavity 114 to receive the fluid and subsequently assemble the two substrates. These walls 113.1, 113.2 will define the cavity intended to receive the fluid.

The two adhesive beads 113.1, 113.2 do not necessarily have the same height, and can have constant or different heights according to the location. They are complementary in terms of thickness, and the cavity 114 once completed has a substantially constant wall 114. The beads 113.1, 113.2 can be discontinuous or not and complementary in terms of span over the substrates 110, 120, which means that one will extend over at least a first portion of the perimeter of the cavity and the other will extend over at least a second portion of the perimeter of the cavity, and the two portions will cover the entire perimeter of the completed cavity.

Other types of adhesives can of course be used, such as, for example, thermosetting adhesives or adhesives that are photocurable under UV radiation.

These adhesives can be deposited on the substrates by serigraphy or by dispensing.

Beads 113.1, 113.2 made of a non-adhesive material may of course be used. The non-adhesive beads are generally made of polymerized materials such as benzocyclobutene BCB or resin SU8, by contrast with the adhesive beads. It is also possible to produce non-adhesive beads, as described above, by steps of deposition, lithography and etching of inorganic materials such as silicon oxide and silicon nitride.

Alternatively, one bead may be adhesive while the other is not, if at least two beads are provided.

Figure 4C:
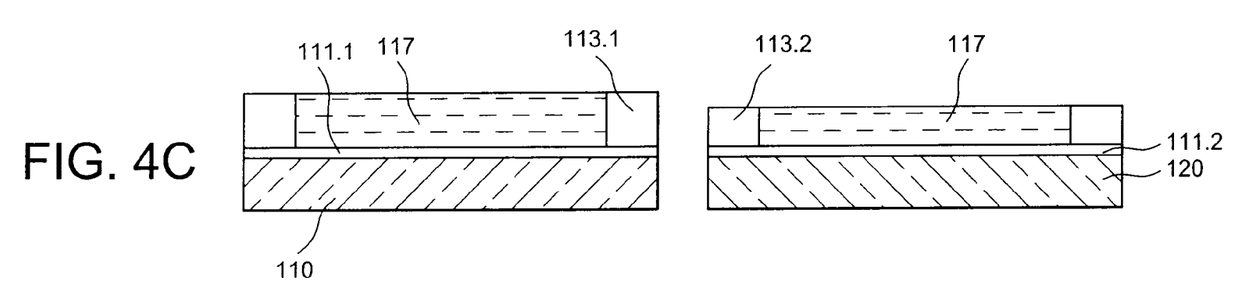

It is then possible to deposit, for each of the substrates 110, 120, in the space defined by the adhesive bead 113.1, 113.2, if it is continuous, fluid 117 (FIG. 4C). If the bead 113.1, 113.2 is not continuous, the fluid can be introduced into the cavity only after the two substrates have been assembled, as will be seen below.

In the example described in FIG. 4, each dish 116.1, 116.2 has a base 115.1, 115.2 formed by the membrane and not directly by the substrate as in the previous example.

Figure 4D:
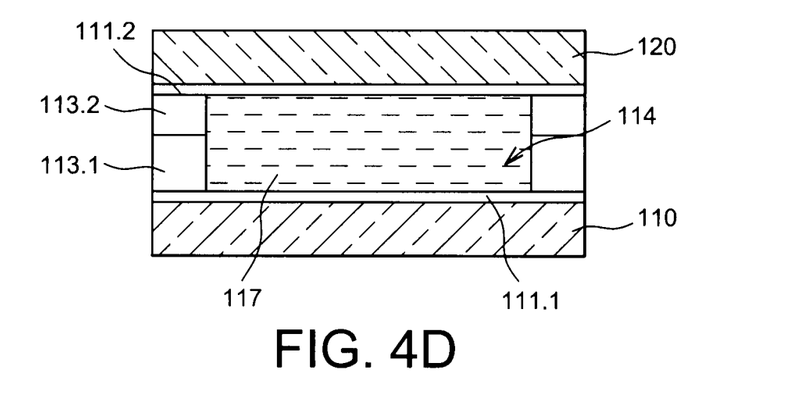

The two substrates 110, 120 are then assembled to one another by being placed one on top of the other. The dishes 116.1, 116.2 are arranged opposite one another so as to encapsulate the fluid 117 between the two membranes 111.1, 111.2 (FIG. 4D). If at least one of the beads 113.1, 113.2 used to define the cavity is adhesive, this assembly is performed without any problem. If none of the beads is adhesive, adhesive is placed on at least one of the beads. This assembly can be performed with a liquid as the fluid, because the volumes are low and the surface tensions are sufficient.

Figure 4E:
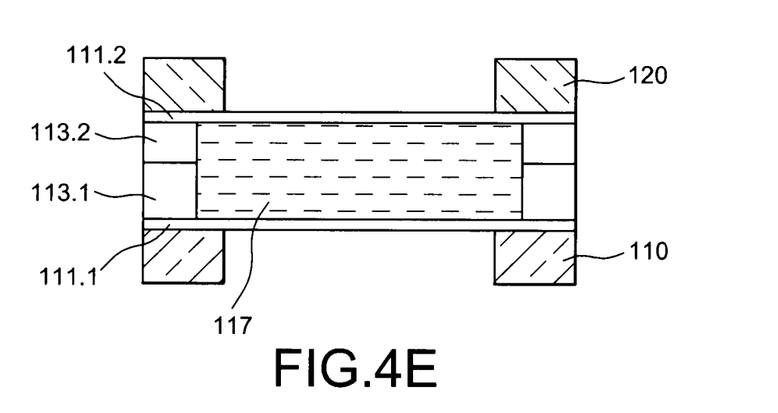

It is then possible to remove the two substrates 110, 120 entirely or partially, in order to release the two membranes 111.1, 111.2 at least in the central portion thereof.

In FIG. 4E, only the substrates 110, 120 have been partially removed.

In FIG. 4, instruments have not been shown, but of course they would be produced as described in the first example provided with regard to FIG. 3.

In the first example of the method of the invention described in reference to FIG. 3, it was mentioned that it was possible to produce a wall on the first substrate, on the side of the membrane. This configuration is shown in FIG. 4B.

In the description of the first example, it was indicated that the base 115 of the dish 116 had to allow the fluid 117 to be optimally spread. In the second example, the base is produced by the membranes. This condition is still desirable in the second example, but, in addition, insofar as the walls defining the cavity are not generally made of the same material as the bases, it is preferable, for each substrate, for the wall to be made of a material with a wettability that is lower than that of the base so as to prevent an overflow of fluid.

In FIGS. 5A to 5G, different steps of another alternative of the method according to the invention are shown. In this alternative, only a single membrane is provided, and the filling of the cavity is performed only after the two substrates have been assembled.

Figure 5A:
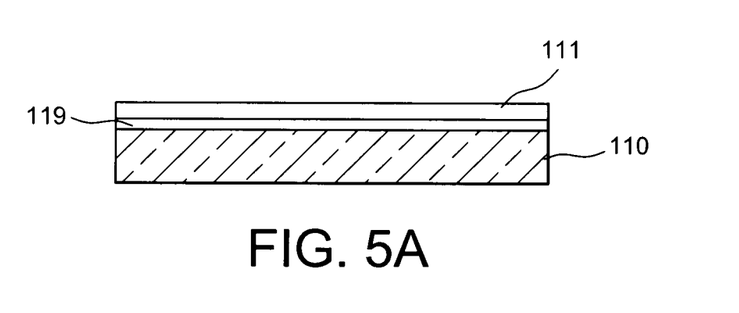
FIGS. 5A to 5G show different steps of a third example of an embodiment of a device with a membrane used to encapsulate a fluid, according to the invention.

If it is desirable to control the state of stress of the membrane as it is released, this stress preferably being a tensile stress in order to prevent any buckling at rest, it is recommended to insert a buffer layer 119 between the first substrate 110 and the membrane 111. This is what is shown in FIG. 5A. This buffer layer has the state of stress desired for the membrane. The stress of the membrane can be determined by simulation based on parameters related to the membrane, the buffer layer and optionally at least one other layer that would be present, which parameters are, for example, the initial state of stress, the Young's modulus, and the thickness. Once released, the membrane will not have the same stress as the buffer layer. The stress of the released membrane is dependent on the parameters cited above.

This buffer layer 119 can be made of silicon oxide or silicon nitride, for example. It can be produced by plasma vapor deposition PECVD. The buffer layer 119 could have been used in the two previous embodiments.

Figure 5B:
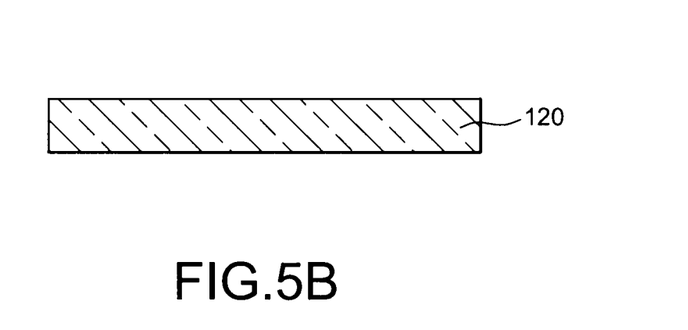
Figure 5C:
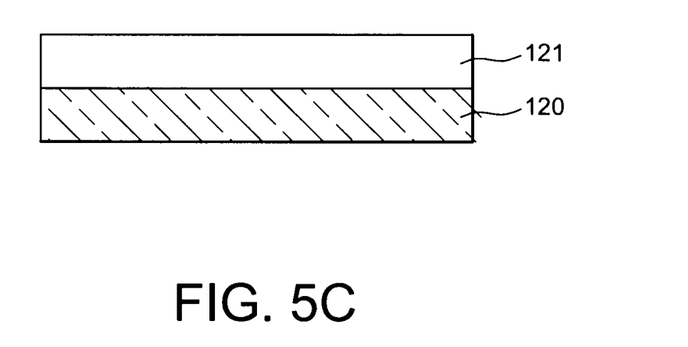

The second substrate 120 will serve as a base for the modeling of the cavity (FIG. 5B). A layer 121 intended to be modeled in order to form the wall 113 of the cavity is deposited on the second substrate 120 (FIG. 5C).

If it is desirable to use a preformed layer to be modeled, it is possible to use a deep-drawn layer, for example, made of polyethylene terephthalate PET, polyethylene naphthalate PEN, polymethyl methacrylate PMMA, or polycarbonate PC.

Figure 5D:
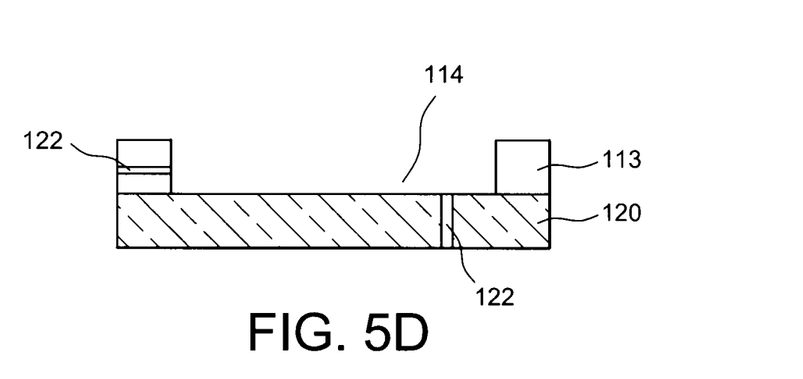

Alternatively, the layer to be modeled can be obtained by deposition of an inorganic material, such as silicon oxide or silicon nitride and lithography and etching operations. The layer to be modeled 121 is preserved only at the level of what will become the wall 113 of the cavity 114 (FIG. 5D).

Figure 5E:
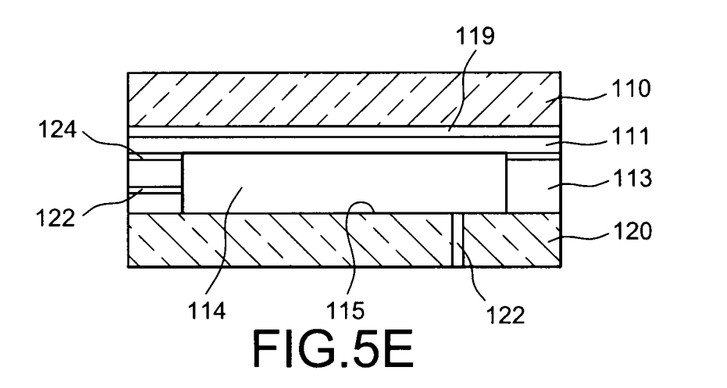

FIG. 5E shows the assembly of the two substrates 110, 120 to complete the cavity 114. The membrane 111 is bonded to the wall 113 of the cavity 114. An adhesive seal 124 is inserted between the membrane and the top portion of the wall 113 of the cavity 114.

Figure 5F:
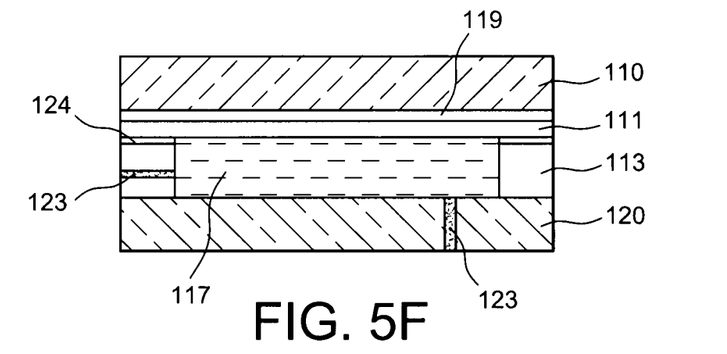

At least one through-hole 122 is drilled in the second substrate, and fluid 117 is injected via said through hole 121. The through-hole 122 leads to the base 115 of the cavity 114. The through-hole 117 is then plugged. The plug is denoted by reference 123 (FIG. 5F).

This filling mode is suitable if the fluid is gas, but not only that. Of course, the through-hole must not attack the membrane. It is possible to produce the through-hole for filling, in the wall of the cavity and not in its base, which would be particularly suitable if the two substrates are covered with a membrane. FIGS. 5D to 5G show both a through-hole in the substrate 120 and in the wall 113.

In the example described, the through-holes 122 were drilled before assembly of the two substrates. If the substrate is silicon, the drilling can be performed by DRIE or by wet etching. Other methods also suitable for other types of substrates are laser drilling, machining and sanding, for example.

It is possible to drill the through-holes 122 after the two substrates have been assembled. It is simply necessary to prevent the substrate or wall debris from penetrating the cavity and remaining there.

Figure 5G:
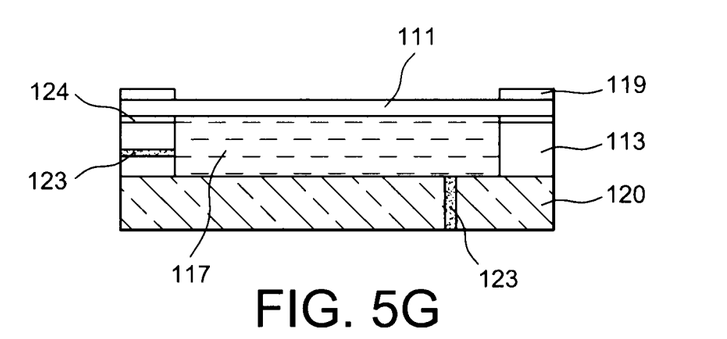

FIG. 5G shows the first substrate 110, which has been entirely removed, and the buffer layer 119 only partially. It remains at the level of the wall of the cavity. It could have been entirely removed. The membrane 11 has a central portion, which is released.

Of course, the substrate could have been partially preserved as in FIG. 4E. It also would have been possible to entirely remove the buffer layer.

It is preferable, in particular if it is desirable to entirely remove the substrate, to choose a material that allows the buffer layer to be detached in order to enable the substrate to be removed.

The buffer layer 119 can have a temporary adhesion property. In this case, it is entirely removed. It is also possible to introduce, if the buffer layer does not have this temporary adhesion property, an additional layer between the buffer layer and the substrate, having this temporary adhesion property.

It should be noted that the buffer layer can also be used to control the stress in the membrane and/or, as described above, to remove the substrate when it has this temporary adhesion property.

The temporary adhesion can be obtained, for example, with a material of which the adhesion decreases when the temperature increases. It is possible to use, for example, for the buffer layer, which would have this temporary adhesion property, or for the additional layer, HT 1010 adhesive produced by Brewer Science. If there is an additional layer, the buffer layer can be made of another material.

If the buffer layer is made of silicon oxide or silicon nitride, for example, it also can be removed by reactive ion etching or wet chemical etching with, for example, hydrofluoric acid for silicon oxide and orthophosphoric acid for silicon nitride.

With regard to documents [1], [2], and [3], the method according to the invention makes it possible to expand the range of materials that can be used for the membrane, in particular for low thicknesses, less than around 50 micrometers, and even less than 10 micrometers and, for example, between 1 and 5 micrometers.

The same applies to the range of the type of liquids by comparison with the teaching of document [2]. This makes it is possible to optimize the operation of the device, in particular by making the movement of the membrane more effective, since it is possible to use more flexible materials than in the prior art.

It is also possible to provide the membrane with an instrument in particular in contact with the fluid, which was not possible in the methods described in documents [1], [2] and [3].

The method of the invention makes it possible, by releasing the membrane after assembly of the two substrates and filling the cavity with fluid, to provide the membrane, as it is being released, with mechanical support by the fluid encapsulated in the cavity.

Thus, if the membrane is subjected to residual internal stresses, the releasing of the membrane after encapsulation enables the fluid encapsulated and in contact with it to help to support it and possibly to influence its deformation.

If the membrane has been released before the filling, deformations of it, for example buckling, may hinder the fluid filling operation.

With the method of the invention, it is possible to use very flexible membranes and, for example, membranes with a low thickness with respect to the diameter. For example, the membrane may have a thickness of less than 10 micrometers for diameters larger than one millimeter.

Such a membrane may have a low Young's modulus, for example less than 10 GPa. It is then possible to use fine organic materials in order to produce it. Such materials can be used only if the membrane is released before filling.

The flexibility of the membrane can be characterized by a deformation during actuation that is greater than its thickness, which corresponds to a mechanical regimen of large deformations.

In addition, the releasing of the membrane after filling is much easier than the releasing before filling. In this last case, high stresses are produced by handling of the substrates due to the fragility of the membrane and by the choice of the processes to be used. For example, a deep reactive ion etching process cannot be used due to the difference in pressure between the suction of the substrate holder and the vacuum of the chamber. This difference in pressure may cause the membrane to break.

Instead, the releasing of the membrane after assembly of the substrates and filling with fluid, as in the method of the invention, makes it possible to use methods specific to microsystems.

The method of the invention also makes it possible to better control the deformation of the membrane at rest, and all the more so if the fluid is incompressible. The presence of an incompressible fluid, i.e. a liquid or an incompressible gel, is advantageous with respect to the configurations with a compressible fluid because the membrane can be supported on the incompressible fluid without being subjected to the effects of the differences in pressure between the two faces of the membrane. This makes it possible to prevent the membrane from bursting due to the force exerted by the fluid when the device is placed under vacuum, during the step of removal of the substrate by reactive ion etching or from collapsing at the base of the cavity if the pressure in the cavity is too low at the end of the process.

With regard to the patent application FR 2 919 073, since a sacrificial material is not used in the cavity, there is no risk of hindrance by the remainder of sacrificial material that cannot be removed.

Although several embodiments of the present invention have been presented and described in detail, it should be understood that various changes and modifications can be made without going beyond the scope of the invention.

The various alternatives described must be understood not to be mutually exclusive.

CITED DOCUMENTS

[1] "Microfluidic design and fabrication of wafer-scale varifocal liquid lens", Jeong Yub Lee et al., Proceedings of SPIE 7426, 7426231-11 (2009).
[2] "Liquid-filled varifocal lens on a chip", Seung Tae Choi et al., Proceedings of SPIE 7208, 72080P1-9 (2009).
[3] "Polymer thin film deposited on liquid for varifocal encapsulated liquid lenses" Nguyen Binh-Khiem et al. Appl. Phys. Lett. Volume 93, Issue 12, pages 124101 à 124101-3 (2008).

The invention claimed is:
1. Method for producing a device with a membrane used to encapsulate a fluid contained in a cavity, wherein:
   two substrates are provided;
   a membrane is placed on one and/or on the other of the substrates;
   one or more walls are formed, helping to laterally define the cavity, in which said walls are located on or in one of the substrates and/or on or in the other of the substrates, and said cavity is intended to contain the fluid, the two substrates are assembled together by superimposing one on the other so as to complete the cavity, in which the or each membrane also helps to define the cavity, the fluid is encapsulated in the cavity between the substrates, and the or each membrane is soaked by the fluid, at least a portion of one of the substrates and/or the other of the substrates is removed insofar as one and/or the other of the substrates are equipped with a membrane, in order to release the membrane at least in the central portion thereof, and the membrane is at least partially supported by the fluid as it is released.

2. Method according to claim 1, wherein the fluid is deposited on one of the substrates or it is distributed over the two substrates before the two substrates are assembled.

3. Method according to claim 1, wherein the fluid is introduced into the cavity once the two substrates are assembled.

4. Method according to claim 3, wherein the introduction is performed by means of at least one through-hole in one of the substrates and/or in a wall.

5. Method according to claim 1, wherein a buffer layer is inserted between one of the substrates and the membrane and/or between the other of the substrates and the membrane, in which said buffer layer has a desired tensile stress so that the membrane has a determined tensile stress when it is released.

6. Method according to claim 5, wherein the buffer layer is removed in order to release the membrane at least in the central portion thereof.

7. Method according to claim 1, wherein the membrane and/or one of the substrates is equipped with at least one instrument.

8. Method according to claim 7, wherein the instrument is in contact with the fluid.

9. Method according to claim 1, wherein the formation of the walls on one of the substrates is performed by deposition of a material in a bead, which material can be adhesive, and/or by etching of the substrate and/or by depositing a modeling layer on the substrate, then etching the modeling layer and/or by using a preformed modeling layer.

10. Method according to claim 1, wherein the membrane is produced by chemical vapor deposition if it is inorganic or in parylene or by spin coating or by plating a film if it is organic.

11. Method according to claim 1, wherein the assembly of the two substrates is performed by bonding.

12. Method according to claim 2, wherein the fluid is deposited by a so-called dispensing technique or by spraying.

13. Method according to claim 1, wherein the fluid is a liquid, a gas or a gel.

14. Method according to claim 3, wherein the fluid is introduced by a so-called dispensing technique or by spraying.

* * * * *